United States Patent
Pu

(10) Patent No.: US 10,533,609 B2
(45) Date of Patent: Jan. 14, 2020

(54) ROLLER BEARING

(71) Applicant: Jiaqi Pu, Hangzhou (CN)

(72) Inventor: Jiaqi Pu, Hangzhou (CN)

(73) Assignee: RGE MOTOR DIRECT INC., City of Industry, CA (US)

( * ) Notice: Subject to any disclaimer, the term of this patent is extended or adjusted under 35 U.S.C. 154(b) by 0 days.

(21) Appl. No.: 15/653,847

(22) Filed: Jul. 19, 2017

(65) Prior Publication Data
US 2019/0024719 A1    Jan. 24, 2019

(51) Int. Cl.
*F16C 35/04* (2006.01)
*F16C 13/00* (2006.01)
*B65G 41/00* (2006.01)

(52) U.S. Cl.
CPC .......... *F16C 35/042* (2013.01); *F16C 13/006* (2013.01); *F16C 35/045* (2013.01); *B65G 41/003* (2013.01); *Y10T 16/19* (2015.01); *Y10T 16/361* (2015.01); *Y10T 16/364* (2015.01)

(58) Field of Classification Search
CPC .... F16C 13/006; F16C 35/042; F16C 35/045; F16C 33/7886; Y10T 16/361; Y10T 16/364; Y10T 16/379; Y10T 16/3837; Y10T 16/1867; Y10T 16/19; B65G 17/24; E01B 25/24
USPC ....... 384/18, 49, 55–56, 296, 512–513, 543; 16/91, 94 R, 106–105; 105/150; 198/790; 104/93, 106, 112, 135
See application file for complete search history.

(56) References Cited

U.S. PATENT DOCUMENTS

| | | | | |
|---|---|---|---|---|
| 1,355,460 A | * | 10/1920 | Forbes | E01B 25/18 104/115 |
| 1,739,557 A | * | 12/1929 | McTigue | E05D 15/063 16/107 |
| 2,920,918 A | * | 1/1960 | Nojima | B60B 17/00 104/244 |
| 3,072,075 A | * | 1/1963 | Nojima | B61B 12/02 104/112 |
| 4,204,719 A | * | 5/1980 | Murphy | A61H 3/008 104/62 |
| 4,236,456 A | * | 12/1980 | Schreyer | B65G 9/002 104/95 |
| 4,265,181 A | * | 5/1981 | Schreyer | B65G 17/20 104/93 |

(Continued)

FOREIGN PATENT DOCUMENTS

| | | | | |
|---|---|---|---|---|
| CN | 206229937 U | * | 6/2017 | B21F 1/02 |
| JP | 01229760 A | * | 9/1989 | F16C 29/045 |

*Primary Examiner* — Marcus Charles
(74) *Attorney, Agent, or Firm* — Ivan Posey, Esq.; Leech Tishman Fuscaldo & Lampl

(57) ABSTRACT

A bearing comprises an outer casing and an inner casing, wherein each of the outer casing and the inner casing are shaped to hold a plurality of ball bearings to facilitate rotational movement of the outer casing with respect to the inner casing, and wherein the inner casing is shaped to define a circular void that is substantially empty except for structure as needed to hold the plurality of ball bearings against the outer casing, and wherein the outer casing is shaped to form a groove within which to receive a rail. A mounting system is included on the inner casing capable of receiving a mounting bracket to be slid longitudinally with respect to the rail upon the rotational movement of the outer casing.

3 Claims, 2 Drawing Sheets

(56) References Cited

U.S. PATENT DOCUMENTS

| | | | | |
|---|---|---|---|---|
| 4,520,733 | A * | 6/1985 | Willmann | E01B 25/24 |
| | | | | 104/110 |
| 5,462,368 | A * | 10/1995 | Lob | F16C 13/006 |
| | | | | 254/416 |
| 5,704,295 | A * | 1/1998 | Lohr | B62D 1/265 |
| | | | | 104/243 |
| 5,735,214 | A * | 4/1998 | Tsuboi | F16C 29/005 |
| | | | | 104/106 |
| 5,758,583 | A * | 6/1998 | Lohr | B62D 1/265 |
| | | | | 104/244 |
| 6,390,680 | B1 * | 5/2002 | Last | E04H 4/101 |
| | | | | 384/542 |
| 6,659,649 | B2 * | 12/2003 | Ishiguro | F04B 27/0895 |
| | | | | 384/457 |
| 7,350,270 | B2 * | 4/2008 | Fournier | F16C 13/006 |
| | | | | 16/91 |
| 2010/0071582 | A1 * | 3/2010 | Andre | B61F 9/00 |
| | | | | 104/244 |
| 2017/0101112 | A1 * | 4/2017 | Tomren | B61B 13/00 |

* cited by examiner

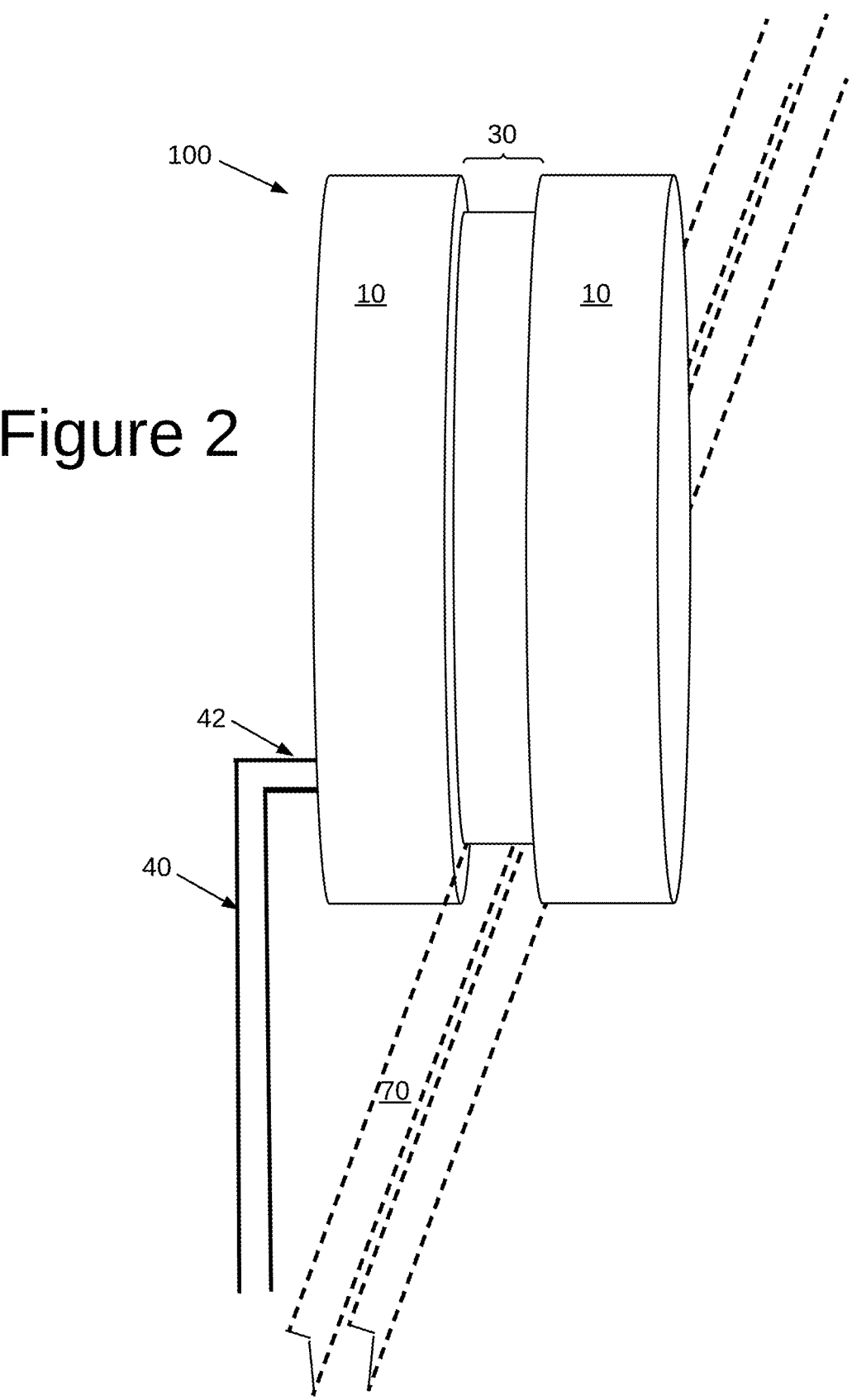

ROLLER BEARING

FIELD OF THE INVENTION

Disclosed and described is a rolling bearing. Specifically, a roller bearing that fits on a track includes an inside hollow surface on which an attachment may provide a means to hang a sliding door or other movable apparatus.

SUMMARY OF THE INVENTION

According to one preferred embodiment, a bearing comprises an outer casing; an inner casing, wherein each of the outer casing and the inner casing are shaped to hold a plurality of ball bearings to facilitate rotational movement of the outer casing with respect to the inner casing, wherein the inner casing is shaped to define a circular void that is substantially empty except for structure as needed to hold the plurality of ball bearings against the outer casing; wherein the outer casing is shaped to form a groove within which to receive a rail; and a mounting system included on the inner casing capable of receiving a mounting bracket to be slid longitudinally with respect to the rail upon the rotational movement of the outer casing.

BRIEF DESCRIPTION OF THE DRAWINGS

FIG. 2 is a right perspective view of the roller bearing on a rail according to the embodiment of FIG. 1.

DETAILED DESCRIPTION OF THE PREFERRED EMBODIMENTS

Figure 1:
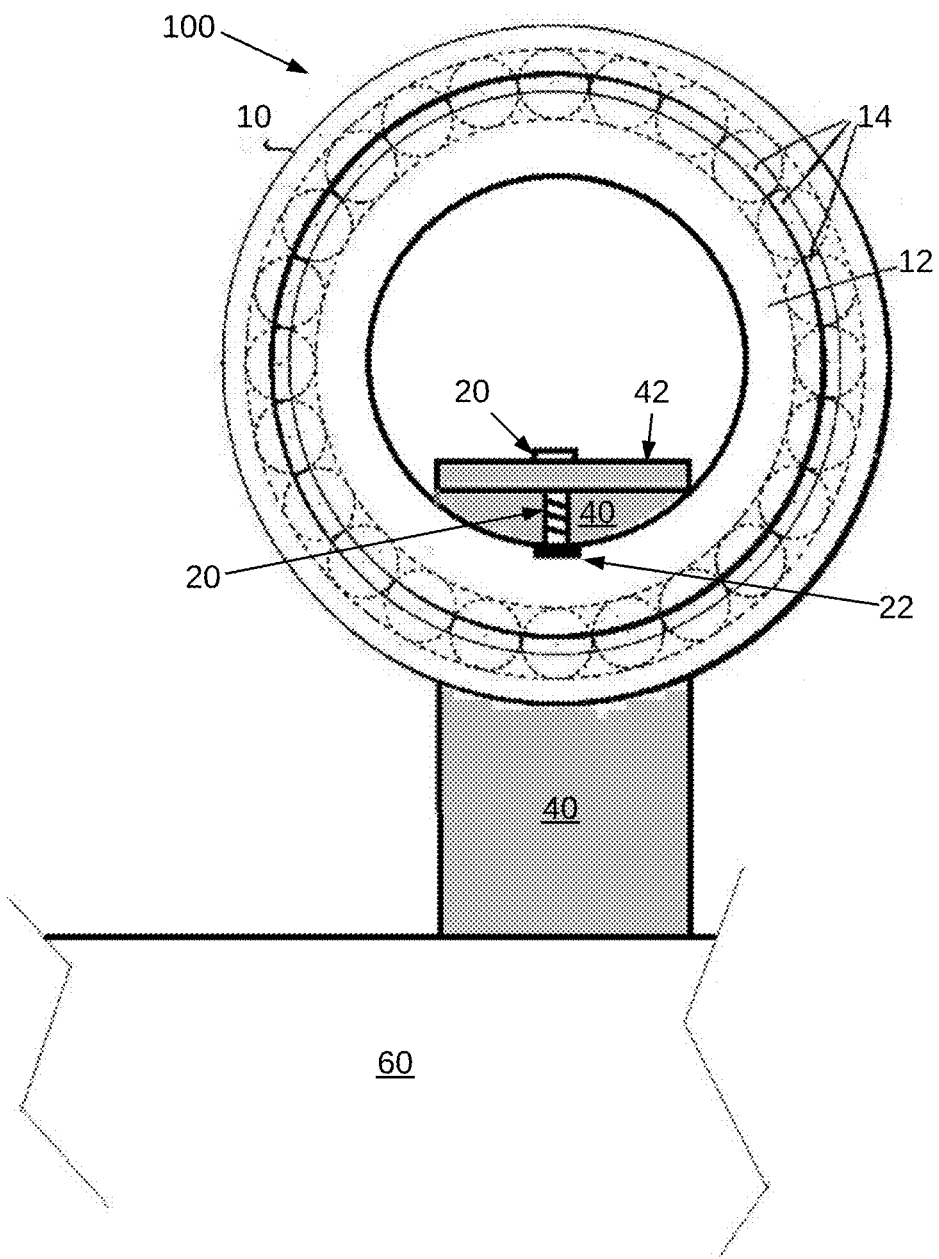
FIG. 1 is a right elevational view of the roller bearing according to one embodiment.

For the purpose of illustrating the invention, there is shown in the accompanying drawings several embodiments of the invention. However, it should be understood by those of ordinary skill in the art that the invention is not limited to the precise arrangements and instrumentalities shown therein and described below.

The microwave oven dish in accordance with preferred embodiments of the present invention is illustrated in FIGS. 1-2, wherein like reference numerals are used throughout to designate like elements.

With reference to FIG. 1, a right elevational view of the roller bearing 100 is shown according to one embodiment. In one embodiment, an outer bearing casing 10 is shaped to house a plurality of bearings 14 (shown in phantom) with respect to a donut-shaped inner casing 12 for the bearings so that the outer bearing casing 10 and may rotate while the inner bearing casing 12 does not rotate. The inner casing may form a relatively large donut hole 50 that is generally void of any further structure.

A mounting system may comprise, for example, a threaded hole or nut 22 drilled into or attached to the inner casing 12. A screw or bolt 20 may be received by the nut 22, which may also be inserted or screwed through a bracket 40, which may comprise, for example, an L-shaped bracket 40 configured to mount a sliding door 60, which may, for example, comprise a closet door or sliding partition for a room.

In one embodiment, the bracket 40, in the form of an L-shape, has an upper portion 42 that is secured to the inner casing 12 by means of the screw 20, and gravity, wherein the inner casing 12 is load bearing to support the door 60 by cradling the upper portion 42 of the bracket 40.

With reference to FIG. 2, a right perspective view of the roller bearing 100 installed to slide on a rail 70 (shown in phantom) according to the embodiment of FIG. 1. The outer casing 10 may comprise a groove 30 that is shaped to snugly fit around the shape of the rail 70 so as to limit lateral movement of the bearing 100, and therefore the door 60 or other item supported by the bracket 40, with respect to the rail 70, while still allowing longitudinal movement as the outer casing 10 rotates with respect to the inner casing 12.

To summarize, a bearing comprises an outer casing; an inner casing, wherein each of the outer casing and the inner casing are shaped to hold a plurality of ball bearings to facilitate rotational movement of the outer casing with respect to the inner casing, wherein the inner casing is shaped to define a circular void that is substantially empty except for structure as needed to hold the plurality of ball bearings against the outer casing; wherein the outer casing is shaped to form a groove within which to receive a rail; and a mounting system included on the inner casing capable of receiving a mounting bracket to be slid longitudinally with respect to the rail upon the rotational movement of the outer casing.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A bearing, comprising:
   an outer casing;
   an inner casing,
   wherein each of the outer casing and the inner casing are shaped to hold a plurality of ball bearings to facilitate rotational movement of the outer casing with respect to the inner casing,
   wherein the inner casing is shaped to define a circular void that is substantially empty except for structure as needed to hold the plurality of ball bearings against the outer casing;
   wherein the outer casing is shaped to form a groove within which to receive a rail; and
   a mounting system included on the inner casing capable of receiving a mounting bracket to be slid longitudinally with respect to the rail upon the rotational movement of the outer casing.

2. The bearing of claim 1, wherein the bracket comprises an L-shaped bracket capable of mounting a sliding door.

3. The bearing of claim 1, wherein the groove that is shaped to snugly fit around the shape of the rail so as to limit lateral movement of the bearing, while still allowing longitudinal movement as the outer casing rotates with respect to the inner casing.

* * * * *